US007259669B2

(12) United States Patent
Cargonja et al.

(10) Patent No.: US 7,259,669 B2
(45) Date of Patent: Aug. 21, 2007

(54) METHOD AND APPARATUS FOR DETECTING UNAUTHORIZED INTRUSION INTO A CONTAINER

(75) Inventors: Nikola Cargonja, San Carlos, CA (US); Philip J. Keleshian, San Jose, CA (US); Roderick E. Thorne, Palo Alto, CA (US); Steven J. Farrell, Sunnyvale, CA (US); Ravindra U. Rajapakse, San Francisco, CA (US); Gustavo Padilla, San Jose, CA (US)

(73) Assignee: Savi Technology, Inc., Mountain View, CA (US)

( * ) Notice: Subject to any disclaimer, the term of this patent is extended or adjusted under 35 U.S.C. 154(b) by 186 days.

(21) Appl. No.: 10/824,844

(22) Filed: Apr. 15, 2004

(65) Prior Publication Data

US 2004/0263329 A1    Dec. 30, 2004

Related U.S. Application Data

(60) Provisional application No. 60/504,580, filed on Sep. 19, 2003, provisional application No. 60/496,056, filed on Aug. 18, 2003, provisional application No. 60/464,067, filed on Apr. 18, 2003.

(51) Int. Cl.
*G08B 1/08* (2006.01)
(52) U.S. Cl. .............. 340/539.18; 340/539.1; 340/572.1; 340/573.3; 340/573.1
(58) Field of Classification Search ........ 340/539.1, 340/539.18, 572.1, 573.3, 573.4, 573.1
See application file for complete search history.

(56) References Cited

U.S. PATENT DOCUMENTS

| 3,597,753 A | 8/1971 | Tabankin |
| 3,665,449 A | 5/1972 | Elder et al. |
| 3,878,539 A | 4/1975 | Gooding |

(Continued)

FOREIGN PATENT DOCUMENTS

CA    2239928 A1    12/1998

(Continued)

OTHER PUBLICATIONS

Nikola Cargonja, Philip J. Keleshian, Roderick E. Thorne and Steven J. Farrell, U.S. Appl. No. 60/464,067 filed Apr. 18, 2003 for "Techniques for Detecting Intrusion Into a Cargo Container".

(Continued)

*Primary Examiner*—Daryl C Pope
(74) *Attorney, Agent, or Firm*—Haynes and Boone, LLP

(57) ABSTRACT

An intrusion detection technique involves: emitting a wireless signal within a container; detecting the wireless signal near the container; and responding to detection of a change in a characteristic of the detected wireless signal by transmitting a wireless notification to a location remote from the container. A different technique involves: responding to a determination that a condition representative of unauthorized intrusion is present while the container is stationary by transmitting a wireless notification; and responding to a determination that the container is moving by ignoring whether the condition is present. Yet another technique involves: monitoring whether a door of a container is in a closed position; and emitting a wireless signal indicating whether the container door is in the closed position.

83 Claims, 3 Drawing Sheets

U.S. PATENT DOCUMENTS

| | | | |
|---|---|---|---|
| 4,258,359 | A | 3/1981 | McLamb |
| 4,438,428 | A | 3/1984 | Ober et al. |
| 4,484,181 | A | 11/1984 | Schwartz |
| 4,683,461 | A | 7/1987 | Torre |
| 4,688,244 | A | 8/1987 | Hannon et al. |
| 4,808,974 | A | 2/1989 | Cantley |
| 5,072,212 | A | 12/1991 | Sorenson |
| 5,247,279 | A | 9/1993 | Sato |
| 5,341,123 | A | 8/1994 | Schuman, Sr. et al. |
| 5,422,627 | A | 6/1995 | Tap et al. |
| 5,448,220 | A * | 9/1995 | Levy .................. 340/539.26 |
| 5,499,014 | A | 3/1996 | Greenwaldt |
| 5,572,191 | A | 11/1996 | Lundberg |
| 5,615,247 | A | 3/1997 | Mills |
| 5,729,199 | A | 3/1998 | Cooper et al. |
| 5,844,482 | A | 12/1998 | Guthrie et al. |
| 5,907,812 | A | 5/1999 | Van De Berg |
| 5,917,433 | A * | 6/1999 | Keillor et al. ............. 340/989 |
| 5,936,523 | A | 8/1999 | West |
| 5,939,982 | A | 8/1999 | Gagnon et al. |
| 6,236,911 | B1 * | 5/2001 | Kruger ........................ 701/1 |
| 6,271,753 | B1 | 8/2001 | Shukla |
| 6,483,473 | B1 | 11/2002 | King et al. |
| 6,497,656 | B1 | 12/2002 | Evans et al. |
| 6,512,455 | B2 * | 1/2003 | Finn et al. ............... 340/572.1 |
| 6,608,554 | B2 * | 8/2003 | Lesesky et al. ............ 340/431 |
| 6,736,316 | B2 | 5/2004 | Neumark |
| 6,744,352 | B2 * | 6/2004 | Lesesky et al. ............ 340/431 |
| 6,747,558 | B1 | 6/2004 | Thorne et al. |
| 6,748,292 | B2 | 6/2004 | Mountz |
| 6,753,775 | B2 * | 6/2004 | Auerbach et al. ...... 340/539.22 |
| 6,844,829 | B2 | 1/2005 | Mayor |
| 6,919,803 | B2 * | 7/2005 | Breed .................. 340/539.14 |
| 6,975,224 | B2 | 12/2005 | Galley, III et al. |
| 2004/0012502 | A1 | 1/2004 | Rasmussen |
| 2004/0119588 | A1 | 6/2004 | Marks |
| 2004/0233041 | A1 | 11/2004 | Bohman et al. |
| 2006/0012481 | A1 | 1/2006 | Rajapakse et al. |

FOREIGN PATENT DOCUMENTS

| | | |
|---|---|---|
| EP | 0 467 036 A2 | 1/1992 |
| EP | 0 825 554 A1 | 2/1998 |
| EP | 0 984 400 A2 | 3/2000 |

OTHER PUBLICATIONS

Nikola Cargonja, Philip J. Keleshian, Roderick E. Thorne and Ravindra U. Rajapakse, U.S. Appl. No. 60/496,056 filed Aug. 18, 2003 for "Technique Using Cargo Container Motion as a Factor in Intrusion Detection".

Gustavo Padilla and Roderick E. Thorne, U.S. Appl. No. 60/504,580 filed Sep. 19, 2003 for "Technique Using Cargo Container Door Sensor as a Factor In Intrusion Detection".

Nicholas D. Cova, Mark S. Weidick, and Blair B. LaCorte, U.S. Appl. No. 60/518,553 filed Nov. 7, 2003 for "Method and Apparatus for Increased Container Security".

Ravindra U. Rajapakse, Roderick E. Thorne, Robert Fraser Jennings, Steven J. Farrell and Liping Julia Zhu, U.S. Appl. No. 60/588,229 filed Jul. 15, 2004 for "Method And Apparatus for Effecting Control or Monitoring Within a Container".

Nicholas D. Cova, Mark S. Weidick and Blair B. LaCorte, U.S. Appl. No. 10/984,026 filed Nov. 8, 2004 for "Method and Apparatus for Increased Container Security".

Ravindra U. Rajapakse, Steven J. Farrell, Mark S. Weidick, Nicholas D. Cova, John L. Goodell, Edward D. Schultheis, William S. Dawson and Kent G. Merritt, U.S. Appl. No. 10/974,481 filed Oct. 27, 2004 for "Container Security and Monitoring".

Ravindra U. Rajapakse, Steven J. Farrell, Mark S. Weidick, Nicholas D. Cova, John L. Goodell, Edward D. Schultheis and William S. Dawson, U.S. Appl. No. 10/975,035 filed Oct. 27, 2004 for "Security and Monitoring For Containers".

Ravindra U. Rajapakse, Steven J. Farrell, Nicholas D. Cova, Mark S. Weidick, Roderick E. Thome and Gustavo Padilla, U.S. Appl. No. 60/514,968 filed Oct. 27, 2003 for "Mechanisms for Secure RF Tags on Containers".

Roderick E. Thome, Philip J. Keleshian, Timothy R. Redler, Joseph S. Chan and Nikola Cargonja, U.S. Appl. No. 60/332,480 filed Nov. 9, 2001 for "Method and Apparatus for Providing Container Security with a Tag".

Steven J. Farrell, Blair B. LaCorte, and Ravindra U. Rajapakse, U.S. Appl. No. 11/158,300 filed Jun. 21, 2005 for "Method and Apparatus for Monitoring Mobile Containers".

Nikola Cargonja, Timothy R. Redler, Richard D. Lockyer and Kent G. Merritt, U.S. Appl. No. 11/266,018 filed Nov. 3, 2005 for "Method and Apparatus for Monitoring the Voltage of a Battery".

Richard D. Lockyer, U.S. Appl. No. 60/732,240 filed Nov. 1, 2005 for "Apparatus and Method for Capacitive Sensing of Door Position".

Richard D. Lockyer and David H. Beauley, U.S. Appl. No. 11/336,402 filed Jan. 20, 2006 for "Method and Apparatus for Capacitive Sensing of Door Position".

PCT Search Report (Forms PCT/ISA/220 and 210) and PCT Written Opinion (Form PCT/ISA/237) mailed by the European Patent Office on Aug. 3, 2004 in PCT Application No. PCT/IB2004/001154, 16 pages.

* cited by examiner

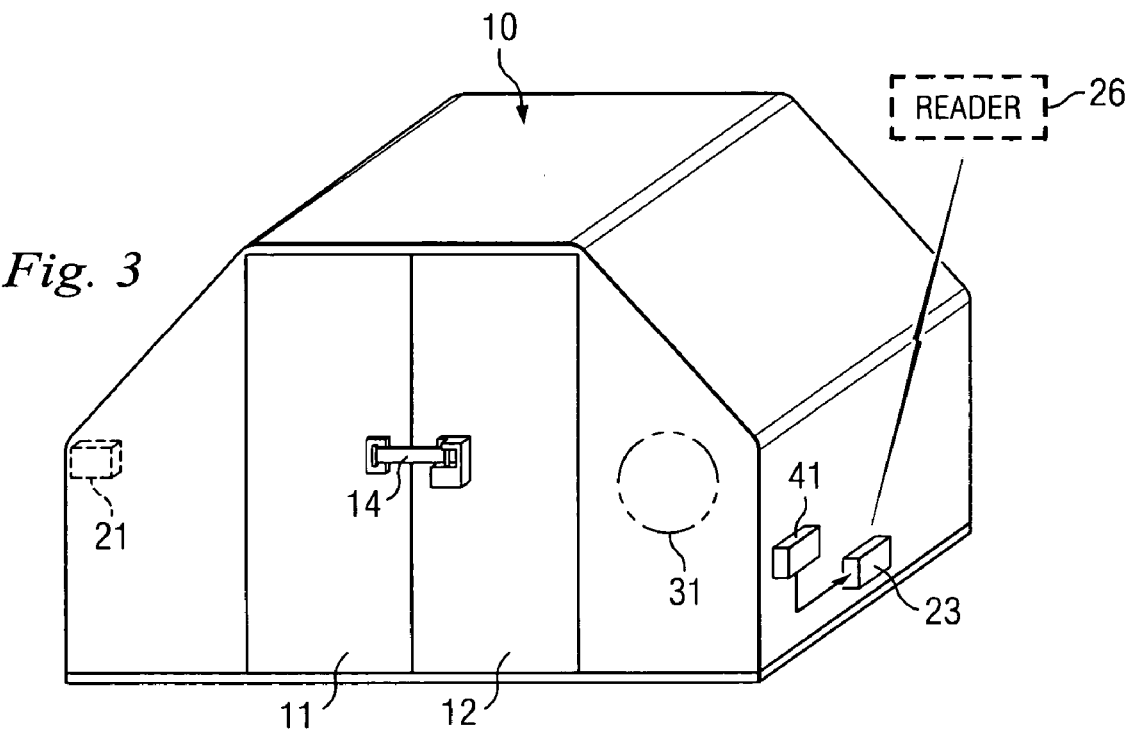
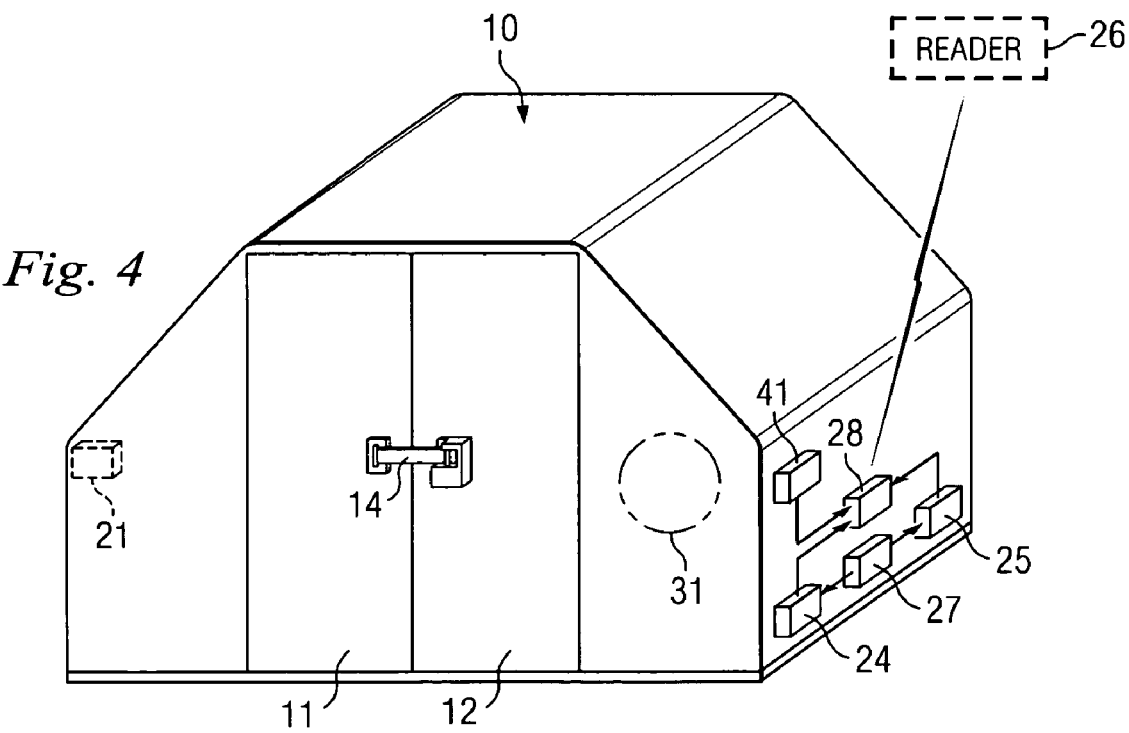

METHOD AND APPARATUS FOR DETECTING UNAUTHORIZED INTRUSION INTO A CONTAINER

This application claims the priority under 35 U.S.C. §119 of provisional application numbers 60/464,067 filed Apr. 18, 2003, 60/496,056 filed Aug. 18, 2003, and 60/504,580 filed Sep. 19, 2003.

FIELD OF THE INVENTION

This invention relates in general to security techniques and, more particularly, to techniques for detecting unauthorized intrusion into a container.

BACKGROUND OF THE INVENTION

Metal cargo containers are designed with provisions to secure the entry doors in order to prevent unauthorized entry into the container while it is in transit. One known approach is to secure the door handle or latch with a conventional lock. Another approach is to secure the door handle or latch with a steel bolt that is fitted with a non-removable retainer. The bolt must be cut with bolt cutters in order to release the handle or latch so that the doors can be opened.

Still another approach is to provide a device which includes a steel bolt and non-removable retainer in combination with a radio frequency identification (RFID) tag. Once the retainer has been coupled to the bolt, the RFID tag monitors the retainer and bolt and, if any tampering is detected, the tag transmits a radio signal to a remote receiver known as a reader, so that an alarm condition can be brought to the attention of a human operator and/or security personnel, who will then deal with the intrusion into the container.

Despite security measures of the type discussed above, it can be possible for the container doors to be opened without directly defeating security measures of the type discussed above. For example, it may be possible to cut the door handle or the latch. Similarly, where a door handle is fixedly connected to a rotatable connecting link which has at each end a dog that engages a recess provided in the container housing, it may be possible to cut through the connecting link and thus permit the ends of the link to be rotated so as to free the dogs from the recesses, thereby permitting the door to be opened. Still other approaches include drilling out the door handle joint, removing the door hinge pins, or cutting a hole in the sheet metal walls or roof, or through the wooden floor. There is a need for an effective technique for detecting any of these types of intrusion, in a manner that is reliable and avoids false alarms.

A further consideration is that there are some situations in which it is helpful to take into account the effects of container movement during shipment. For example, when a container is lifted from the ground and placed on a vehicle such as a truck or a ship, the position of the cargo within the container may shift. Alternatively, after the container has been loaded on a vehicle, normal vehicle movement could cause the cargo to shift position within the container. The shifting cargo should not be misinterpreted by a security system as human movement, or the security system may produce a false indication of human intrusion.

As another example, a typical cargo container is normally made of steel except for the floor, which is usually made of wood. If a monitoring system is relying on some form of electromagnetic field for the purpose of detecting unauthorized human intrusion, movement of the container may affect the electromagnetic field. For example, energy of an electromagnetic field will not readily pass through the steel walls, but will more readily pass through the wooden floor. When the container is sitting on the ground, the ground may influence characteristics such as the strength of any electromagnetic field which may be passing through the wooden floor.

If the container is then lifted off the ground, for example while it is loaded on a vehicle, the wooden floor will be spaced from the ground, thereby reducing the extent to which the ground can influence characteristics such as the strength of any electromagnetic field which may be passing through the wooden floor. To the extent a security system is relying on the electromagnetic field to try to detect human intrusion into the container, this change in the electromagnetic field as the container is lifted off the ground may be misinterpreted as human activity, and may cause the security system to produce a false indication of human intrusion. With these considerations in mind, it will be recognized that there is a need for a technique which can reliably detect unauthorized human intrusion into a cargo container, with little likelihood of false indications of intrusion as a result of factors such as container motion.

SUMMARY OF THE INVENTION

One form of the invention involves: emitting a wireless signal within a container; detecting the wireless signal in the region of the container; monitoring the detected wireless signal for a change in a characteristic thereof; and responding to detection of a change in the characteristic of the detected wireless signal by transmitting a wireless notification of the occurrence of the change to a location remote from the container.

A different form of the invention involves: monitoring a container for a condition representative of unauthorized intrusion into the container; determining whether the container is stationary; responding to a determination that the condition is present while the container is stationary by transmitting a wireless notification of the presence of the condition; and responding to a determination that the container is moving by ignoring whether the condition is present.

Yet another form of the invention involves: monitoring whether a door of a container is in a closed position; and emitting a wireless signal indicating whether the container door is in the closed position.

BRIEF DESCRIPTION OF THE DRAWINGS

A better understanding of the present invention will be realized from the detailed description which follows, taken in conjunction with the accompanying drawings, in which:

FIG. 3 is a diagrammatic view similar to FIG. 1, but showing yet another alternative embodiment, which includes the addition of a motion detector coupled to the transmitter;

FIG. 4 is a diagrammatic view similar to FIG. 2, but showing still another alternative embodiment, which includes the addition of a motion detector coupled to the transmitter;

DETAILED DESCRIPTION

Figure 1:
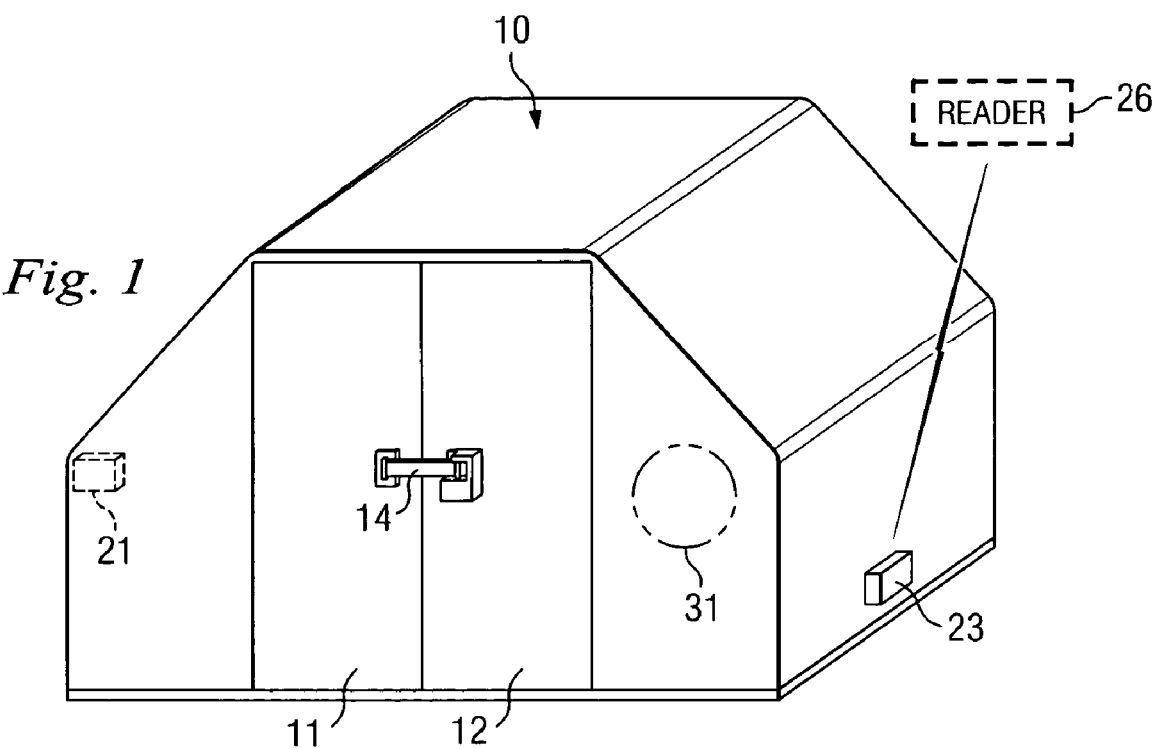
FIG. 1 is a diagrammatic view showing a cargo container of a known type, with a transmitter disposed inside the container, a receiver disposed on the outside of the container, and a stationary reader disposed in the region of the container.

FIG. 1 is a diagrammatic view showing a cargo container 10 of a known type. In FIG. 1, the container 10 has a wooden floor, and the remainder thereof is made of steel. However, the container could alternatively be made of other materials. The container 10 has two doors 11 and 12, and a handle and lock assembly which is shown diagrammatically at 14. A low power (for example 1 mW) radio frequency (RF) transmitter 21 is installed inside the container, near the junction of a wall and the roof. The transmitter 21 transmits a beacon pulse encoded with an identification number unique to that particular transmitter. A radio frequency receiver/transmitter 23 is fixed to the outside of the container 10, and is configured to detect only RF signals transmitted by the transmitter 21 inside the container. When the container 10 is in the region of a stationary RF reader of a known type, one of which is shown diagrammatically at 26, the receiver/transmitter 23 can engage in RF communication with the reader 26.

When the container doors 11 and 12 are closed and the metal skin is intact, emissions from the internal transmitter 21 are shielded by the metal skin, except for skin effect currents which are induced on the inside surfaces and conducted around the edges of openings such as cracks at the door joints, or where the bottoms of the side walls meet the wooden floor. The receiver/transmitter 23 on the outside of the container 10 receives, measures, and records the power level of this attenuated RF signal from the transmitter 21.

If a door 11 or 12 is opened, or if a hole is cut through the metal skin of the container (for example as shown diagrammatically at 31) radio frequency emissions will increase by radiation through the area of the opening, and by skin effect conduction around the edges of the opening, and the resulting increase in the signal level will be detected by the outside receiver/transmitter 23. If the increase in signal power exceeds a selected threshold, which is adjustable and chosen to suppress RF noise-induced false alarms, the outside transmitter 23 will sense and log the change in state, and may perform one or more additional tasks.

In more detail, the receiver/transmitter 23 will log the change in state and the time it occurred, and will retain that data until the container 10 is in proximity to an RF reader such as that shown at 26, and the reader interrogates that receiver/transmitter 23 and retrieves the data. This may occur almost immediately if the container 10 is already near a reader 26, or may occur later, as soon as the container 10 first comes near a reader 26. Alternatively, the receiver/transmitter 23 may log the change in state and the time it occurred and immediately begin to transmit periodic RF pulses encoded with that data. If the container 10 is already near a reader 26, then these pulses will be detected almost immediately by the reader 26. Otherwise, the pulses will be detected after a period of time, as soon as the container 10 again comes near a reader 26.

In either case, when a reader receives from the receiver/transmitter 23 an RF signal containing data indicating that an intrusion has occurred, the reader 26 will convey the information through a not-illustrated data network of a known type to monitoring equipment of a known type, in order to notify operators of the occurrence of the intrusion.

As a practical matter, radio frequency noise and changes in the electromagnetic properties of the environment may produce false signals. Consequently, the receiver/transmitter 23 has a processor executing an adaptive algorithm of a known type in order to recognize and eliminate such false signals. In association with this, the receiver/transmitter 23 is self-calibrating, in that it measures the initial state of the received RF power level, which will depend upon the environment of each installation, and thereafter looks only for changes from that baseline condition.

Figure 2:
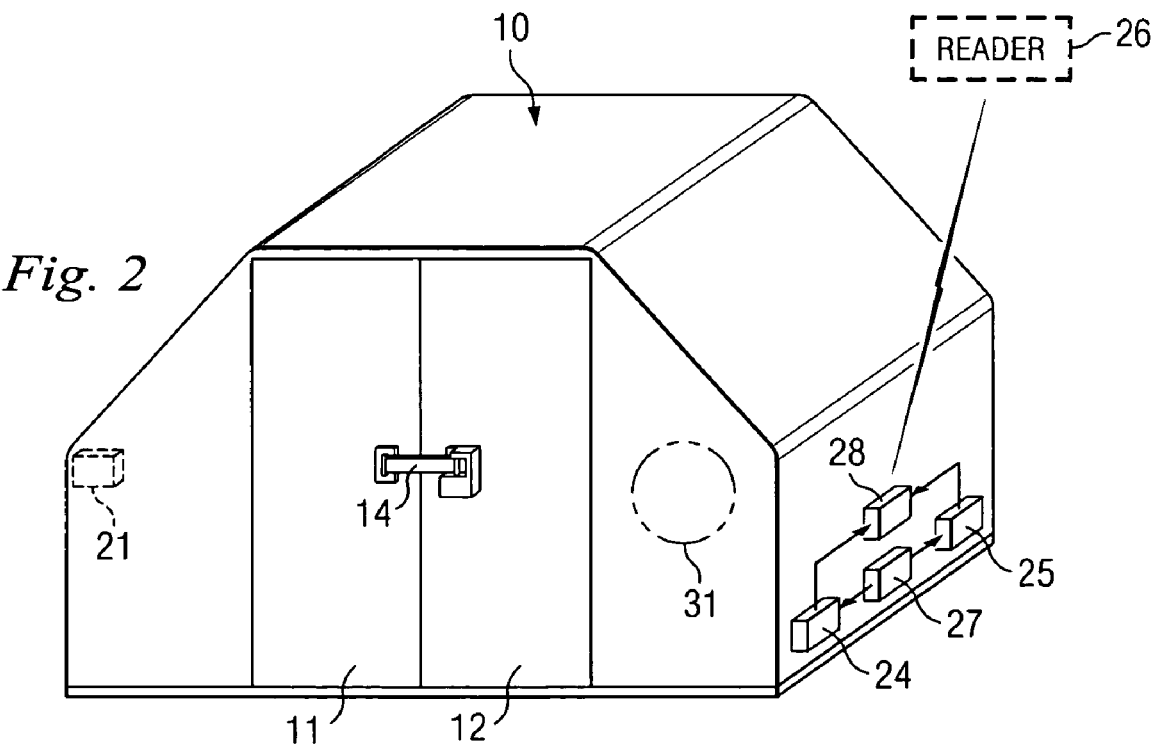
FIG. 2 is a diagrammatic view similar to FIG. 1, but showing an alternative embodiment which includes a cargo container of a known type, a transmitter disposed inside the container, two receivers disposed on the outside of the container, an oscillator which synchronizes both receivers, a transmitter coupled to both receivers, and a stationary reader disposed in the region of the container.

A different technique for sensing intrusion into a container involves detection of changes in radio frequency electrical path lengths inside the container of interest. In more detail, FIG. 2 is a diagrammatic view of an alternative embodiment which includes a cargo container 10 that is identical to the container 10 of FIG. 1, except that it has a different arrangement of RF transmitters and receivers, as explained below. In particular, a low power radio frequency transmitter 21 placed at one end of the container 10 emits waves in all directions. At these radio frequencies, the RF wavelength is short in comparison to the dimensions of the container 10, and radio waves traveling along different paths inside the container will have different total phase delays. Two RF receivers 24 and 25 are placed at the opposite end of the container, on opposite corners, and receive the signal after it propagates through different paths in space and by conduction through the container walls, such that the signal has a unique and different phase delay at the location of each of the receivers 24 and 25. The receivers 24 and 25 are synchronized by a common local oscillator (shown diagrammatically at 27), and the difference in phase between the two signals can therefore be reliably detected. When the RF electrical path length from the transmitter 21 to either receiver 24 or 25 is changed by intrusion of a mass sufficient to change the dielectric and magnetic properties of that path, a change will occur in the phase difference between the two signals received by the receivers 24 and 25, and can be detected. When a hole is cut in the container skin, for example as shown diagrammatically at 31, it will change the electrical paths in a manner which also causes a change in the phase difference of the signals detected by the receivers 24 and 25.

The receivers are each coupled to a transmitter, for example as shown diagrammatically at 28. In a manner similar to that described above for the transmitter 23 in FIG. 1, the transmitter 28 in FIG. 2 will log the change in phase difference in the two signals detected by the two receivers 24 and 25, and the time it occurred. The transmitter 28 will retain that data until the container 10 is in proximity to an RF reader such as that shown at 26, and the reader interrogates the transmitter 28 and retrieves the data. This may occur almost immediately if the container 10 is already near a reader 26, or may occur later, as soon as the container 10 first comes near a reader 26. Alternatively, the transmitter 28 may log the change in phase difference and the time it occurred, and immediately begin to transmit periodic RF pulses encoded with that data. If the container 10 is already near a reader 26, then these pulses will be detected almost immediately by the reader 26. Otherwise, the pulses will be detected after a period of time, as soon as the container 10 again comes near a reader 26.

In either case, when a reader 26 receives from the transmitter 28 an RF signal containing data indicating that an intrusion has occurred, the reader 26 will convey the information through a not-illustrated data network of a known type to monitoring equipment of a known type, in order to notify operators of the occurrence of the intrusion.

As a practical matter, the configuration shown in FIG. 2 is also subject to radio frequency noise and changes in the electromagnetic properties of the environment that can produce false signals. Consequently, the receivers 24 and 25 each have a processor executing an adaptive algorithm of a known type, in order to recognize and eliminate such false signals. In association with this, the transmitter 28 is self-calibrating, in that it measures the initial phase difference between the RF signals received by the receivers 24 and 25, which will depend upon the environment of each installation, and thereafter looks only for changes from that baseline condition.

In the embodiment of FIG. 2, the receivers 24 and 25 are shown mounted at spaced locations on the exterior of the container 10. However, it would alternatively be possible to mount them in some other configuration in which they are spaced. As one example, the receivers 24 and 25 could be mounted at spaced locations within the container 10. A further consideration is that, for clarity, FIG. 2 shows the receiver 24, the receiver 25, the local oscillator 27 and the transmitter 28 as physically separate units. Alternatively, however, one or more of these components could be integrated into a single physical unit.

Although operation of the embodiments of FIGS. 1 and 2 is satisfactory for many applications, there are other applications in which their operation may be influenced by container movement. For example, when the container 10 is lifted from the ground and placed on a vehicle such as a truck or a ship, the position of the cargo within the container may shift. Alternatively, after the container 10 has been loaded onto a vehicle, normal movement of the vehicle could cause the cargo within the container 10 to shift position. With reference to FIG. 1, such a cargo shift may affect the power level of the RF signal emitted by the transmitter 21, as measured at the receiver/transmitter 23. Consequently, a false intrusion detection alarm may be issued by the receiver/transmitter 23. With reference to FIG. 2, a cargo shift may change the paths of travel of one or both of the signals detected by the receivers 24 and 25, thereby resulting in a change in their phase difference which causes the transmitter 28 to issue a false intrusion detection alarm.

Another example of a situation in which container movement may be a problem is where the container 10 is made almost entirely of steel, but has a wooden floor. The intrusion detection arrangements shown in each of FIGS. 1 and 2 emit RF energy within the container 10, which will not readily pass through the steel walls, but may pass readily through the wooden floor. When the container is sitting on the ground, some of the RF energy may pass through the wooden floor, be reflected from the ground, pass back through the wooden floor, and then influence the overall characteristics of the RF energy within the container. If the container is lifted off the ground, for example as it is loaded onto a vehicle, the RF energy which passes downwardly through the wooden floor will no longer be reflected by the ground, and thus will not travel back into the container through the wooden floor. Consequently, the overall characteristic of the RF energy within the container can change as the container is lifted off the ground.

With reference to FIG. 1, the reduction in reflected RF energy may affect the power level of the RF energy emitted by the transmitter 21, as measured at the receiver/transmitter 23. Consequently, a false intrusion detection alarm may be issued the receiver/transmitter 23. With reference to FIG. 2, the reduction in reflected RF energy may influence one or both of the signals detected by the receivers 24 and 25 in a manner changing their phase difference, thereby causing the transmitter 28 to issue a false intrusion detection alarm.

FIG. 3 is a diagrammatic view similar to FIG. 1, but showing an alternative embodiment which is identical to the embodiment of FIG. 1, except for the addition of a motion detector 41 which is fixedly mounted on a wall of the container 10, and which helps to reduce the likelihood of false intrusion detection alarms as a result of container movement. In more detail, the motion detector 41 is a commercially available device of a known type, which can sense physical movement, and which can produce an electrical signal indicating whether or not movement is being detected. The output of the motion detector 41 is coupled to an input of the receiver/transmitter 23.

When the motion detector 41 is outputting a signal that indicates it is detecting container motion, the receiver/transmitter 23 responds to this signal by disabling its evaluation of whether there has been intrusion into the container 10. Stated differently, the receiver/transmitter 23 evaluates whether there has been unauthorized intrusion in the same manner discussed above in association with FIG. 1, but only when the motion detector 41 is indicating that the container 10 is stationary. Unauthorized human intrusion into the container 10 is most likely to occur when the container is stationary, and thus the accuracy and reliability of intrusion detection is high in the embodiment of FIG. 3, because false intrusion detection alarms due to container movement are avoided. For simplicity and clarity, the motion detector 41 is shown in FIG. 3 as a separate component, but it will be recognized that it could alternatively be integrated with one or more of the other components, such as the receiver/transmitter 23.

FIG. 4 is a diagrammatic view similar to FIG. 2, but showing an alternative embodiment which is identical to the embodiment of FIG. 2, except for the addition of a motion detector 41 which is equivalent to the motion detector discussed above in association with FIG. 3. The motion detector 41 in FIG. 4 is fixedly mounted on a wall of the container 10, and helps to reduce the likelihood of false intrusion detection alarms as a result of container movement. The output of the motion detector 41 is coupled to an input of the transmitter 28.

When the motion detector 41 is outputting a signal that indicates it is detecting container motion, the transmitter 28 responds to this signal by disabling its evaluation of whether there has been intrusion into the container 10. Stated differently, the transmitter 28 evaluates whether there has been unauthorized intrusion in the same manner discussed above in association with FIG. 2, but only when the motion detector 41 is indicating that the container 10 is stationary. Unauthorized human intrusion into the container 10 is most likely to occur when the container is stationary, and thus the accuracy and reliability of intrusion detection is high in the embodiment of FIG. 4, because false intrusion detection alarms due to container movement are avoided. For simplicity and clarity, the motion detector 41 is shown in FIG. 4 as a separate component, but it will be recognized that it could alternatively be integrated with one or more of the other components, such as the transmitter 28.

Figure 5:
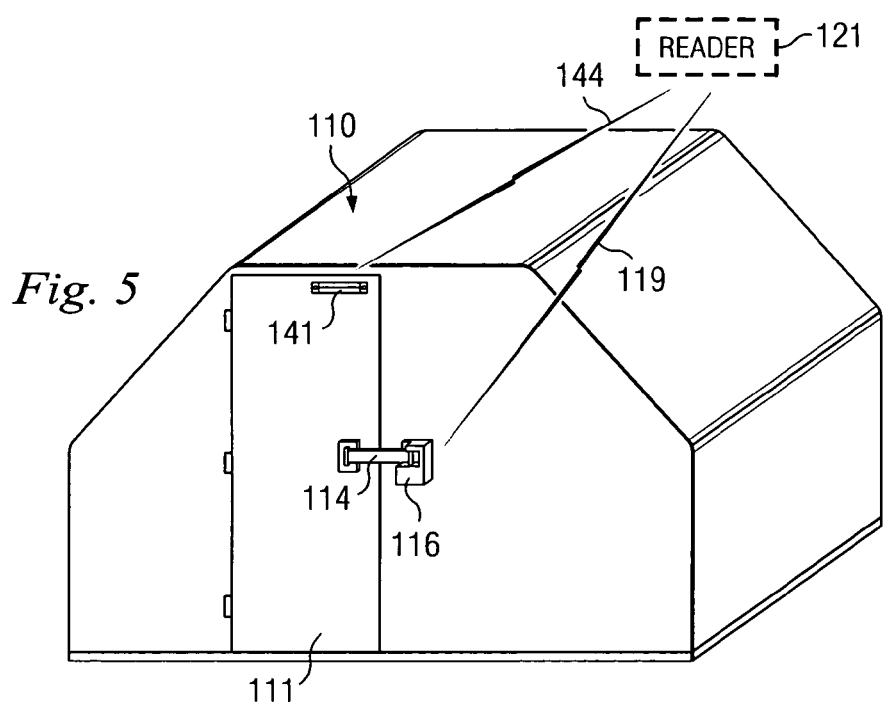
FIG. 5 is a diagrammatic perspective view of another alternative embodiment, showing a cargo container of a known type, with a transmitter mounted on the exterior of the container, and a stationary reader disposed in the region of the container.

FIG. 5 is a diagrammatic perspective view showing a cargo container 110 of a known type, which is similar to the container 10 of FIGS. 1–4. The major parts of the container 110 are all made of steel, except that the floor of the container 110 is made of wood. The container 110 could alternatively be made of other suitable materials. The container 110 has a pivotally supported door 111, and a latch assembly 114. The illustrated configurations of the container 110 and its latch assembly 114 are exemplary, and each could alternatively have any one of a number of other configurations. As one example, the latch assembly 114 could alternatively include a vertical cylindrical rod which is rotatably supported on the door 111, which is fixedly coupled to the handle of the latch assembly 114, and which has at each end a dog that can engage a respective recess provided in the exterior surface of the container 110.

The latch assembly 114 is maintained in a locked configuration by a security device 116 of a known type. The security device 116 includes a steel bolt which cooperates with the latch assembly 114, and also includes a housing that cooperates with the bolt and that contains a battery-operated radio frequency identification (RFID) tag of a known type. The RFID tag can send and/or receive radio signals 119, in order to communicate with a nearby stationary reader 121 of a known type.

If the security device 116 detects that it is being subjected to some form of tampering, after its steel bolt has been engaged with the latch assembly 114, the security device 116 transmits a radio signal at 119 to the reader 121. The reader 121 can then present an alarm condition to a human operator and/or security personnel, who can then deal with the intrusion into the container 118. It will often be the case that security personnel can reach the container 110 while the intrusion is still in progress, and apprehend the guilty person.

In the event that the security device 116 does not happen to be within radio range of a reader 121 at the point in time when it first detects tampering, the security device 116 will continue to transmit the radio signal 119 which indicates that there has been tampering. Therefore, if the security device 116 later comes within radio range of a reader 121, the reader 121 will receive the signal 119 and raise an alarm condition at that point in time.

A transmitter 141 is fixedly secured to the upper portion of the exterior surface of the door 111. The transmitter 141 includes a battery-operated RFID tag of a known type, which is generally similar to the tag provided within the security device 116. The transmitter 141 can transmit radio frequency (RF) signals 144 to the reader 121.

Figure 6:
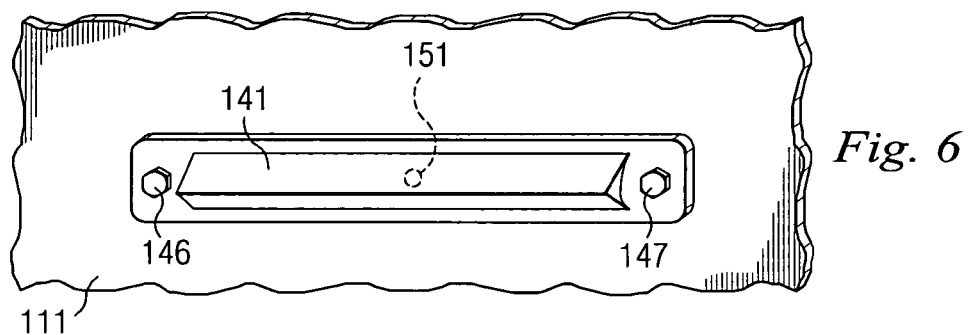
FIG. 6 is a diagrammatic fragmentary perspective view of the transmitter of FIG. 5, in an enlarged scale.

FIG. 6 is a diagrammatic fragmentary perspective view of the transmitter 141 of FIG. 5, in an enlarged scale. Two bolts 146 and 147 fixedly mount the transmitter 141 on the door 111. In this regard, the door 111 has three spaced openings which extend completely through it. Two of these openings receive the shanks of the bolts 146 and 147. The third opening through the door 111 is shown diagrammatically by broken lines at 151. There are not-illustrated wires which extend from the transmitter 141 through the opening 151 to a sensor assembly which is disposed within the container 110, and which is discussed below.

Figure 7:
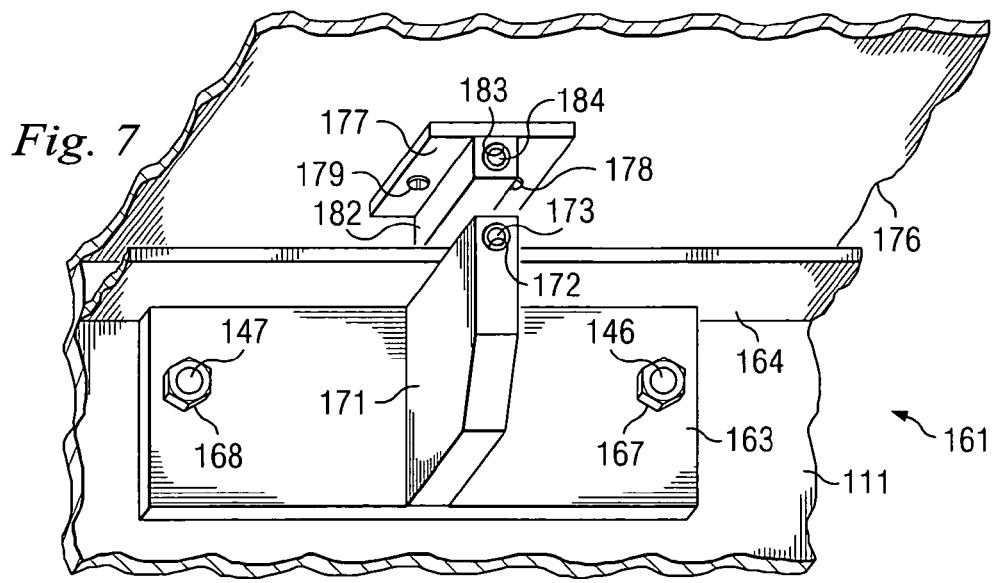
FIG. 7 is a diagrammatic fragmentary perspective view of a sensor arrangement which is provided within the container of FIG. 5.

More specifically, FIG. 7 is a diagrammatic fragmentary perspective view of a portion of the interior of the container 110, and shows at 161 the sensor assembly which was mentioned above. The sensor assembly 161 includes a base plate 163, which is secured to the door 111 just below an inwardly extending metal flange 164 provided at the top edge of the door 111. The base plate 163 has two openings which each receive the threaded shank of a respective one of the bolts 146 and 147. Two nuts 167 and 168 engage the ends of the threaded shanks of the bolts 146 and 147.

The sensor assembly 161 includes a sensor support plate 171, which extends perpendicular to the base plate 163, and which has one edge fixedly secured to the base plate 163 in any convenient manner, for example by welding or by bolts. The support plate 171 has a horizontal cylindrical opening 172 therein, and a magnetic sensor 173 of a known type is fixedly mounted within the opening 172. The magnetic sensor 173 is electrically coupled to the transmitter 141 (FIG. 6) by the not-illustrated wires which extend through the opening 151 in the door 111.

The sensor assembly 161 also includes a further base plate 177, which is fixedly secured to the roof or ceiling of the container 110 by two screws 178 and 179. A metal support part 182 is fixedly secured to the base plate 177 in any convenient manner, for example by welding or by bolts. The support part 182 has a horizontal cylindrical opening 183 therein, and a permanent magnet 184 is fixedly mounted within the opening 183. In the disclosed embodiment, the parts 163, 171, 177 and 182 are all made of aluminum, but they could each alternatively be made of some other suitable material.

In FIG. 7, the door 111 is shown in a closed position, where the magnetic sensor 173 is relatively close to the magnet 184. The sensor 173 will detect the magnetic field of the magnet 184, and will communicate this to the transmitter 141 of FIG. 6 through the wires which extend through the opening 151. In contrast, if the container door 111 is opened, the sensor 173 will be moved to a position in which it is spaced from the magnet 184. Consequently, the sensor 183 will no longer be detecting the magnetic field of the magnet 184, and will communicate this to the transmitter 141 through the not-illustrated wires that extend through the opening 151.

With reference to FIG. 5, when the security device 116 is in place and its steel bolt has been engaged with the latch assembly 114, the security device 116 will periodically transmit at 119 a radio signal which notifies the reader 121 that the security device 116 is in place and has not detected any tampering. Since this relates to an operational state in which the container door 111 is closed, the magnet 184 will be in fairly close proximity to the magnetic sensor 173. The magnetic sensor 173 will thus detect the nearby magnet 184, and will provide notice of this to the transmitter 41 through the not-illustrated wires within the opening 151. The transmitter 141 will transmit radio signals at 144 to relay this knowledge to the reader 121. Consequently, the reader 121 will know that the security device 116 is engaged and not been tampered with, and will also know that the container door 111 is in a closed position.

In the event that a thief manages to open the door 111 without tampering with the security device 116, the magnetic sensor 173 will detect that it has been moved away from the magnet 184, and will supply this information to the transmitter 141 through the not-illustrated wires which extend through the opening 151. The transmitter 141 will then relay this information to the reader 121, through use of radio signals 144. Since the door 111 will have been opened without any tampering with the security device 116, the security device 116 will still be sending radio signals at 119 which indicate to the reader 121 that the security device 116 has not been tampered with. Therefore, since the reader 121 will be receiving an indication from the transmitter 141 that the door 111 has been opened, at a point in time when the security device 116 is indicating it has not been tampered with and that the door 111 is thus still closed, the reader 121 will know from the inconsistency that there has been an unauthorized intrusion. The reader can then present an alarm condition to a human operator and/or security personnel, who will deal with the intrusion into the container 110.

It is optionally possible for the reader 121 to periodically transmit a radio signal at 144 to the transmitter 141, in order to request that the transmitter 141 send back a radio signal confirming that the magnetic sensor 173 is still detecting the magnetic field of the magnet 184, representing a condition in which the door 111 is still closed. If the reader 121 receives no reply to this inquiry from the transmitter 141, the reader 121 can make the assumption that someone has damaged or disabled the transmitter 141. The reader 121 can then assume that the door 111 has probably been opened, and present an appropriate alarm condition so that a person will be sent to investigate whether there has been an intrusion into the container 110.

The magnetic sensor assembly 161 represents a robust approach to intrusion detection, because electromagnetic fields originating externally of the container 110 will be substantially unable to penetrate the steel walls of the container 110. As mentioned above, containers of the type shown at 110 often have a wooden floor rather than a steel floor, but the sensor assembly 161 is intentionally positioned near the roof of the container, or in other words far above the container floor, so that any magnetic field emitted from below the wood floor of the container 110 will not have sufficient strength at the magnetic sensor 173 to override the effect of the magnetic field of the magnet 184.

Although selected embodiments have been illustrated and described in detail, purely by way of example, it should be understood that a variety of substitutions and alterations can be made therein without departing from the spirit and scope of the present invention, as defined by the following claims.

What is claimed is:

1. A method comprising:
   emitting a wireless signal within a container;
   detecting said wireless signal in the region of and externally of said container;
   monitoring said detected wireless signal for a change in a characteristic thereof caused by a circumstance other than a change in said wireless signal as transmitted; and
   responding to detection of a change in said characteristic of said detected wireless signal by transmitting a wireless notification of the occurrence of the change to a location remote from said container.

2. A method according to claim 1, wherein said transmitting of maid wireless notification is carried out promptly after detection of the change.

3. A method according to claim 1, wherein said responding includes saving a time of occurrence of the change.

4. A method according to claim 3, wherein said transmitting of said wireless notification is carried out in response to receipt in the region of said container of a wireless interrogation signal transmitted at a location remote from said container.

5. A method according to claim 1, wherein said detecting includes processing of said wireless signal using arm adaptive technique.

6. A method according to claim 1, wherein said characteristic is a signal strength of said wireless signal at a location where said detecting of said wireless signals take place.

7. A method according to claim 6, wherein said monitoring includes determining whether said signal strength has increased from a valve below a selected threshold to a value above said threshold.

8. A method according to claim 1,
   wherein said detecting is carried out at each of spiced first and second locations external to said container; and
   wherein said characteristic is a phase difference between said wireless signal as detected at said first location and said wireless signal as detected at said second location.

9. A method according to claim 1,
   wherein said wireless signal emitted within said container contains a unique identification code; and
   wherein said monitoring is carried out using only detected wireless signals that include said unique identification code.

10. A method according to claim 1, including:
    monitoring whether a door of said container is in a closed position; and
    emitting a wireless signal indicating whether said container door is in said closed position.

11. A method according to claim 10, wherein said monitoring of said door is carried out within said container.

12. A method according to claim 10, wherein said monitoring of said door is carried out using a magnetic field.

13. A method according to claim 10, including:
    providing a security device which effects locking of said container door in said closed position;
    monitoring whether there has been unauthorized tampering with said security device; and
    emitting a further wireless signal indicating whether unauthorized tampering with said security device has been detected.

14. A method according to claim 10, wherein said emitting of said wireless signal regarding said door is carried out in a manner that includes emitting said wireless signal regarding said door at a location external to said container.

15. An apparatus comprising:
    a container;
    a first transmitter which is supported on said container and emits a wireless signal within said container;
    a receiver which is supported on said container externally thereof, which detects maid wireless signal, and which monitors said detected wireless signal for a change in a characteristic thereof caused by a circumstance other than a change in said wireless signal as transmitted; and
    a second transmitter which responds to detection by said receiver of a change in said characteristic of said detected wireless signal by transmitting a wireless notification of the occurrence of the change to a location remote from said container.

16. An apparatus according to claim 15, wherein said second transmitter transmits said wireless notification promptly after detection of a change in said characteristic.

17. An apparatus according to claim 15, wherein said receiver responds to detection of a change in said characteristic by saving a time of occurrence of the change.

18. An apparatus according to claim 17,
    including at a location remote from said container a pan which can transmit a wireless interrogation signal;
    wherein said receiver can receive said wireless interrogation signal; and
    wherein said second transmitter transmits said wireless notification in response to receipt by said receiver of said wireless interrogation signal.

19. An apparatus according to claim 15, wherein said receiver processes said wireless signal using an adaptive technique.

20. An apparatus according to claim 15, wherein said characteristic is a signal strength of said wireless signal, as measured at a location where said detecting of said wireless signals takes place.

21. An apparatus according to claim 20, wherein said receiver effects said monitoring by evaluating whether said signal strength has increased from a value below a selected threshold to a value above said threshold.

22. An apparatus according to claim 15,
wherein said receiver includes tat and second portions which are respectively disposed at spaced first and second locations external to said container, and which respectively detect said wireless signal at said first and second locations; and
wherein said characteristic is a phase difference between said wireless signal as detected at said first location and said wireless signal as detected at said second location.

23. An apparatus according to claim 15,
wherein said first transmitter inserts a unique identification code into the wireless signal that it emits within said container; and
wherein said receiver effects said monitoring using only detected wireless signals that include said unique identification code.

24. An apparatus according to claim 15;
wherein said container has a door supported for movement to and from a closed position;
including a first portion which monitors whether said door of said container is in said closed position; and
including a second portion which is cooperable with said first portion and which can emit a wireless signal indicating whether said container door is in said closed position.

25. An apparatus according to claim 24, wherein said first portion carries out said monitoring of said door from within said container.

26. An apparatus according to claim 24, wherein said second portion emits said wireless signal at a location external to said container.

27. A method comprising:
monitoring a container for a condition representative of unauthorized Intrusion into the container;
determining whether said container is stationary
responding to a determination that said condition is present while said container is stationary by transmitting a wireless notification of the presence of said condition; and
responding to a determination that said container is moving by ignoring whether said condition is present.

28. A method according to claim 27, wherein said monitoring includes:
emitting wireless signal within said container;
detecting said wireless signal at a location which is near said container and spaced from the location where said wireless signal is emitted; and
evaluating whether a change occurs in a characteristic of said detected wireless signal, said condition being present when said change is detected in said characteristic.

29. A method according to claim 28, wherein said characteristic is a signal strength of said wireless signal at the location where said detecting of said wireless signal takes place.

30. A method according to claim 28,
wherein said detecting of said wireless signal takes place at each of spaced first and second locations external to said container; and
wherein said characteristic is a phase difference between said wireless signal as detected at said first location and said wireless signal as detected at said second location.

31. A method according to claim 28, wherein said detecting of said wireless signal is carried out externally of said container.

32. A method according to claim 27, wherein acid transmitting of said wireless notification is carried out promptly after detection of said condition.

33. A method according to claim 27, wherein said responding to a determination that said condition is present while said container is stationary includes saving a time of occurrence of the change.

34. A method according to claim 33, wherein said transmitting of said wireless notification is carried out in response to receipt near said container of a wireless interrogation signal transmitted at a location remote from said container.

35. An apparatus comprising:
a container;
a first portion which monitors said container for a condition representative of unauthorized intrusion into the container;
a second position which determines whether said container is stationary; and
a third portion which is cooperable with said first and second portions, which responds to a determination that said condition is present while said container is stationary by transmitting a wireless notification of the presence of said condition, and which responds to a determination that said container is moving by ignoring whether said condition is present.

36. An apparatus according to claim 35, wherein said second portion includes a motion sensor which is supported on said container.

37. An apparatus according to claim 35, wherein first portion includes:
a transmitter which emits a wireless signal within said container; and
a receiver which detects said wireless signal at a location that is near said container and spaced from the location where said transmitter emits said wireless signal, and which evaluates whether a change occurs in characteristic of said detected wireless signal, said condition being present when said receiver detects said change in said characteristic.

38. An apparatus according to claim 37, wherein said characteristic is a signal strength of said wireless signal at the location where said receiver detects said wireless signals.

39. An apparatus according to claim 37,
wherein said receiver separately detects said wireless signal at each of spaced first and second locations external to said container; and
wherein said characteristic is a phase difference between said wireless signal as detected at said first location and said wireless signal as detected at said second location.

40. An apparatus according to claim 37, wherein said receiver detects said wireless signal externally of said container.

41. An apparatus according to claim 35, wherein said third portion is responsive to detection of said condition promptly effecting said transmitting at said wireless notification.

42. An apparatus according to claim 35, wherein said third portion responds to a determination that said condition is present while said container is stationary by saving a time of occurrence of the change.

43. An apparatus according to claim 42, wherein said third portion effects said transmitting of said wireless notification in response to receipt near said container of a wireless interrogation signal transmitted at a location remote from said container.

44. An apparatus comprising:
a container having a door supported for movement to and from a closed position;
a first portion which monitors whether said door of said container is in said closed position; and
a second portion which is cooperable with said first portion and which can emit a wireless signal indicating whether said container door is in said closed position;
wherein said first portion carries out said monitoring of said door from within said container, and includes a detector that is supported on said door; and
wherein said second portion is supported on said door and effects said emission of said wireless signal at a location external to said container.

45. An apparatus according to claim 44, wherein said first portion includes a magnetic field generator supported on said container, and wherein said detector is a magnetic field detector, said second portion being responsive to said magnetic field detector, and said magnetic field detector respectively experiencing first and second levels of magnetic flux which are different when said door is respectively in said closed position and spaced from said closed position.

46. An apparatus according to claim 45,
wherein said magnetic field generator includes a permanent magnet;
wherein said magnetic field detector is supported on an inner side of said door and has an electrical output;
and wherein said second portion includes a transmitter supported on an outer side of said door and electrically coupled to said electrical output of said magnetic field detector.

47. An apparatus according to claim 44, including a security device which effects locking of said container door in said closed position, which can detect unauthorized tampering with said security device, and which can emit a further wireless signal indicating whether unauthorized tampering with said security device has been detected.

48. A method comprising:
emitting a wireless signal within a container;
detecting said wireless signal at each of spaced first and second locations in the region of said container;
monitoring said detected wireless signal for a change in a characteristic thereof, said characteristic being a phase difference between said wireless signal as detected at said first location and said wireless signal as detected at said second location; and
responding to detection of a change in said characteristic of said detected wireless signal by transmitting a wireless notification of the occurrence of the change to a location remote from said container.

49. A method according to claim 48, wherein said transmitting of said wireless notification is carried out promptly after detection of the change.

50. A method according to claim 48, wherein said responding includes saving a time of occurrence of the change.

51. A method according to claim 50, wherein said transmitting of said wireless notification is carried out in response to receipt in the region of said container of a wireless interrogation signal transmitted at a location remote from said container.

52. A method according to claim 48, wherein said detecting is carried out externally of said container.

53. A method according to claim 48, wherein said detecting includes processing of said wireless signal using an adaptive technique.

54. A method according to claim 48,
wherein said wireless signal emitted within said container contains a unique identification code; and
wherein said monitoring is carried out using only detected wireless signals that include said unique identification code.

55. A method according to claim 48, wherein said monitoring is carried out by monitoring said detected wireless signal for a change in said characteristic that is caused by a circumstance other than a change in said wireless signal as transmitted.

56. An apparatus comprising:
a container;
a first transmitter which is supported on said container and emits a wireless signal within said container;
a receiver having first and second portions that are respectively supported on said container at spaced first and second locations and that respectively detect said wireless signal at said first and second locations, said receiver monitoring said detected wireless signal for a change in a characteristic thereof, said characteristic being a phase difference between said wireless signal as detected at said first location and said wireless signal as detected at said second location; and
a second transmitter which responds to detection by said receiver of a change in said characteristic of said detected wireless signal by transmitting a wireless notification of the occurrence of the change to a location remote from said container.

57. An apparatus according to claim 56, wherein said second transmitter transmits said wireless notification promptly after detection of a change in said characteristic.

58. An apparatus according to claim 56, wherein said receiver responds to detection of a change in said characteristic by saving a time of occurrence of the change.

59. An apparatus according to claim 58,
including at a location remote from said container a part which can transmit a wireless interrogation signal;
wherein said receiver can receive said wireless interrogation signal; and
wherein said second transmitter transmits said wireless notification in response to receipt by said receiver of said wireless interrogation signal.

60. An apparatus according to claim 56, wherein said first and second locations are each external to said container.

61. An apparatus according to claim 56, wherein amid receiver processes said wireless signal using an adaptive technique.

62. An apparatus according to claim 56,
wherein said first transmitter inserts a unique identification code into the wireless signal that it emits within said container; and
wherein said receiver effects said monitoring using only detected wireless signals that include said unique identification code.

63. An apparatus according to claim 56, wherein said receiver carries out said monitoring in manner that includes monitoring said detected wireless signal for a change in said characteristic that is caused by a circumstance other than a change in said wireless signal as transmitted.

64. A method comprising:
    emitting a wireless signal within a container, said wireless signal containing a unique identification code;
    detecting said wireless signal in the region of said container;
    monitoring said detected wireless signal for a change in a characteristic thereof, said monitoring being carried out using only detected wireless signals that include said unique identification code; and
    responding to detection of a change in said characteristic of said detected wireless signal by transmitting a wireless notification of the occurrence of the change to a location remote from said container.

65. A method according to claim 64, wherein said transmitting of said wireless notification is carried out promptly after detection of the change.

66. A method according to claim 64, wherein said responding includes saving a time of occurrence of the change.

67. A method according to claim 66, wherein said transmitting of said wireless notification is carried out in response to receipt in the region of said container of a wireless interrogation signal transmitted at a location remote from said container.

68. A method according to claim 64, wherein said detecting is carried out externally of said container.

69. A method according to claim 64, wherein said detecting includes processing of said wireless signal using an adaptive technique.

70. A method according to claim 64, wherein said characteristic is a signal strength of said wireless signal at a location where said detecting of said wireless signals takes place.

71. A method according to claim 70, wherein said monitoring includes determining whether said signal strength has increased from a value below a selected threshold to a value above said threshold.

72. A method according to claim 64,
    wherein said detecting is carried out at each of spaced first and second locations external to said container; and
    wherein said characteristic is a phase difference between said wireless signal as detected at said first location and said wireless signal as detected at said second location.

73. A method according to claim 64, wherein said monitoring is carried out by monitoring said detected wireless signal for a change in said characteristic that is caused by a circumstance other than a change in said wireless signal as transmitted.

74. An apparatus comprising:
    a container;
    a first transmitter which is supported on said container and emits a wireless signal within said container, said wireless signal containing a unique identification code;
    a receiver which is supported on said container, which detects said wireless signal, and which monitors said detected wireless signal for a change in a characteristic thereof, said monitoring being carried out using only detected wireless signals that include said unique identification code; and
    a second transmitter which responds to detection by said receiver of a change in said characteristic of said detected wireless signal by transmitting a wireless notification of the occurrence of the change to a location remote from said container.

75. An apparatus according to claim 74, wherein said second transmitter transmits said wireless notification promptly after detection of a change in said characteristic.

76. An apparatus according to claim 74, wherein said receiver responds to detection of a change in said characteristic by saving a time of occurrence of the change.

77. An apparatus according to claim 76,
    including at a location remote from said container a part which can transmit a wireless interrogation signal;
    wherein said receiver can receive said wireless interrogation signal; and
    wherein said second transmitter transmits said wireless notification in response to receipt by said receiver of said wireless interrogation signal.

78. An apparatus according to claim 74, wherein said receiver receives said wireless signal at a location external to said container.

79. An apparatus according to claim 74, wherein said receiver processes said wireless signal using an adaptive technique.

80. An apparatus according to claim 74, wherein said characteristic is a signal strength of said wireless signal, as measured at a location where said detecting of said wireless signals takes place.

81. An apparatus according to claim 80, wherein said receiver effects said monitoring by evaluating whether said signal strength has increased from a value below a selected threshold to a value above said threshold.

82. An apparatus according to claim 74,
    wherein said receiver includes first and second portions which are respectively disposed at spaced first and second locations external to said container, and which respectively detect said wireless signal at said first and second locations; and
    wherein said characteristic is a phase difference between said wireless signal as detected at said first location and said wireless signal as detected at said second location.

83. An apparatus according to claim 74, wherein said receiver carries out said monitoring in a manner that includes monitoring said detected wireless signal for a change in said characteristic that is caused by a circumstance other than a change in said wireless signal as transmitted.

* * * * *

UNITED STATES PATENT AND TRADEMARK OFFICE
CERTIFICATE OF CORRECTION

PATENT NO.      : 7,259,669 B2                                    Page 1 of 1
APPLICATION NO. : 10/824844
DATED           : August 21, 2007
INVENTOR(S)     : Nikola Cargonja et al.

It is certified that error appears in the above-identified patent and that said Letters Patent is hereby corrected as shown below:

Claim 2, Column 9, Line 52, the word "maid" should read as -- said --.

Claim 5, Column 9, Line 62, the word "arm" should read as -- an --.

Claim 6, Column 9, Line 66, the word "take" should read as -- takes --.

Claim 7, Column 10, Line 3, the word "valve" should read as -- value --.

Claim 8, Column 10, Line 6, the word "spiced" should read as -- spaced --.

Claim 15, Column 10, Line 44, the word "maid" should read as -- said --.

Claim 18, Column 10, Line 61, the word "pan" should read as -- part --.

Claim 22, Column 11, Line 13, the word "tat" should read as -- first --.

Claim 32, Column 12, Line 11, the word "acid" should read as -- said --.

Claim 35, Column 12, Line 28, the word "position" should read as -- portion --.

Claim 41, Column 12, Line 66, the word -- for -- should be inserted between the words "condition" and "promptly".

Claim 41, Column 12, Line 67, the word "at" should read as -- of --.

Claim 61, Column 14, Line 55, the word "amid" should read as -- said --.

Signed and Sealed this

Thirteenth Day of November, 2007

JON W. DUDAS
*Director of the United States Patent and Trademark Office*